H. OLIVER.
APPARATUS FOR APPLYING NUTS TO BOLTS.
APPLICATION FILED JUNE 11, 1917.
1,282,116.
Patented Oct. 22, 1918.
2 SHEETS—SHEET 1.
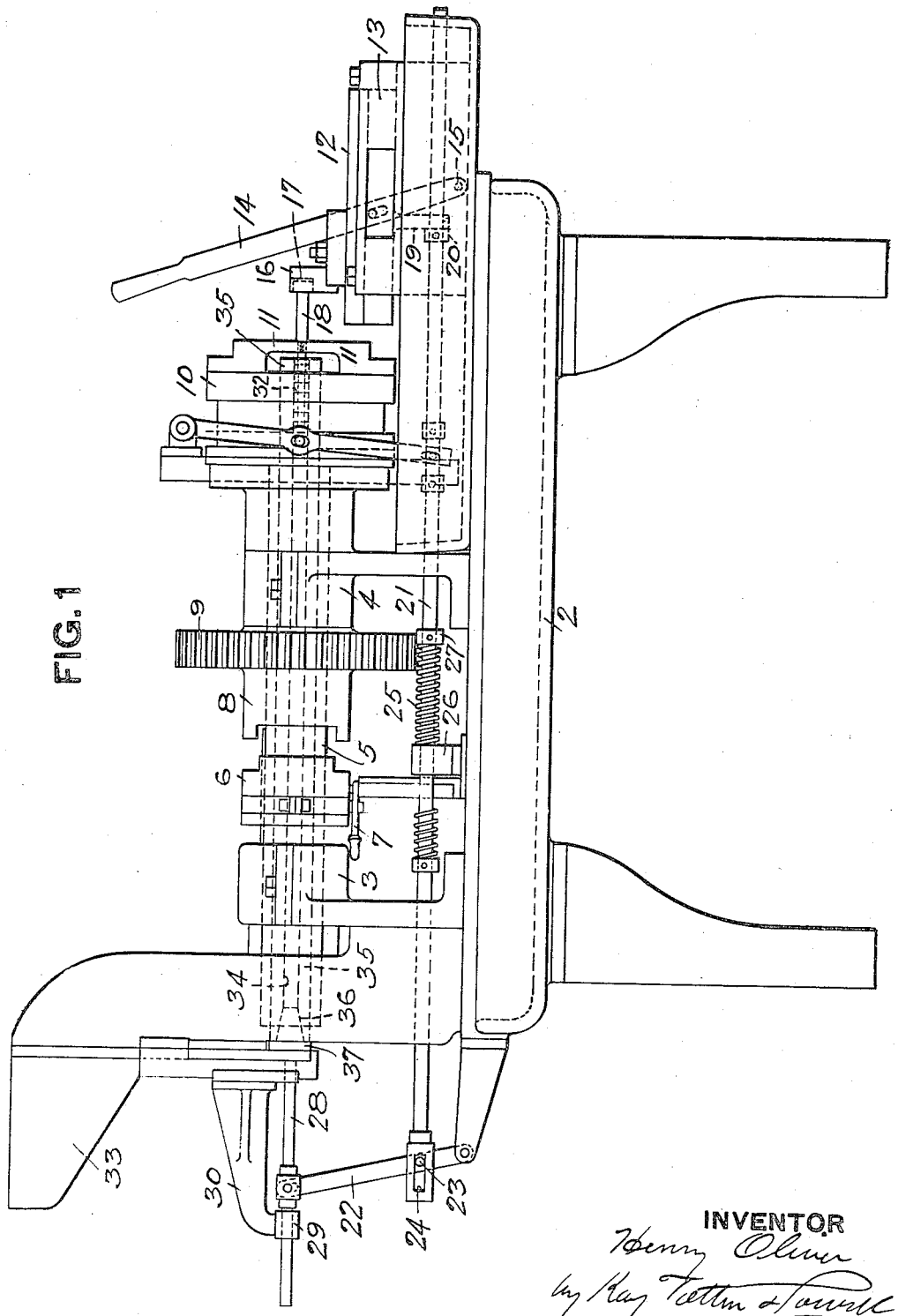
INVENTOR H. OLIVER.
APPARATUS FOR APPLYING NUTS TO BOLTS.
APPLICATION FILED JUNE 11, 1917.
1,282,116.
Patented Oct. 22, 1918.
2 SHEETS—SHEET 2.
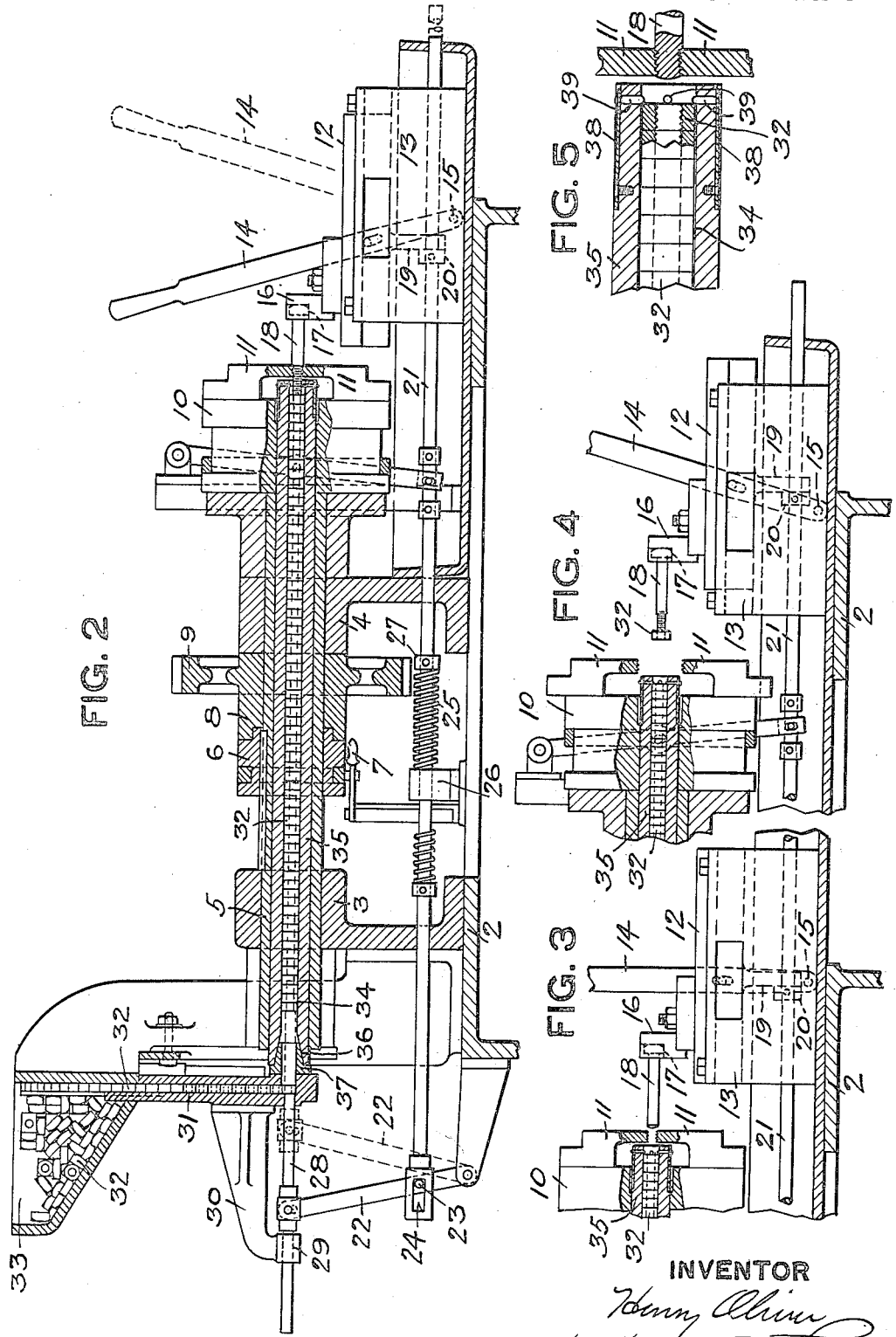
INVENTOR
Henry Oliver
by Kay Totten & Farrell
attys

UNITED STATES PATENT OFFICE.

HENRY OLIVER, OF EDGEWORTH, PENNSYLVANIA.

APPARATUS FOR APPLYING NUTS TO BOLTS.

1,282,116.           Specification of Letters Patent.       Patented Oct. 22, 1918.

Application filed June 11, 1917. Serial No. 174,034.

*To all whom it may concern:*

Be it known that I, HENRY OLIVER, a citizen of the United States, and resident of Edgeworth, in the county of Allegheny and State of Pennsylvania, have invented a new and useful Improvement in Apparatus for Applying Nuts to Bolts; and I do hereby declare the following to be a full, clear, and exact description thereof.

My invention relates to machines for applying nuts to bolts or like articles.

The object of my invention is to provide a machine for applying nuts to bolts which is simple in construction and not liable to get out of order, and one which will greatly reduce the time as well as the cost over machines of this character in which the nuts are applied to the bolts by hand.

In the accompanying drawings, Figure 1 is a side elevation of my improved machine; Fig. 2 is a fragmentary longitudinal sectional view; Fig. 3 is a fragmentary view, partly in section, showing the bolt in position to be fed to the threading dies; Fig. 4 is a like view showing the threading dies open and the bolt with the nut thereon withdrawn; and Fig. 5 is an enlarged detail of one end of the nut-barrel showing the manner of holding the nut in position.

In the drawing, the numeral 2 designates a suitable stand or bed for supporting the machine. Mounted on the bed 2 are the bearings 3 and 4. Within the bearings 3 and 4 is mounted the hollow spindle 5. A sliding clutch 6 is mounted on the spindle 5, said clutch being operated by the handle 7. This clutch is adapted to be thrown into and out of engagement with the sleeve 8 mounted loosely on the spindle 5, said sleeve carrying the gear-wheel 9, which may be driven by any suitable power.

Secured to the outer end of the spindle 5 is the rotary die-head 10, which carries the thread chasers 11. This chuck has not been illustrated in detail as it is complicated in form and is what is known as the Landis rotary die-head, well-known to those skilled in the art.

A slide-block 12 is adapted to move back and forth in the guide 13, said slide-block being moved back and forth by means of the lever 14, which is pivoted at 15. The slide-block 12 carries the bolt-holder 16, having a seat 17 adapted to receive the head of the bolt 18.

The slide 12 has the arm 19, which is adapted to engage the collar 20 on the longitudinally-movable rod 21. The outer end of the rod 21 is connected to the arm 22, a pin 23 on said arm engaging the slot 24 in said rod. A spring 25 is interposed between the abutment 26 and the collar 27 on said rod.

The upper end of the arm 22 is connected to the pusher 28, which moves in the guide 29 in the bracket 30. This pusher 28 operates in conjunction with the chute 31 down which the nuts 32 move by gravity, being delivered to said chute from the hopper 33 in any suitable manner. The purpose of the pusher 28 is to deliver the nuts one by one to the bore or passage 34, in the barrel or holder 35. This barrel 35 is preferably formed in two parts, being divided longitudinally, and said barrel is contained within the hollow spindle 5.

The entrance to the bore 34 is outwardly-flaring, as at 36, and a guide-bushing 37 engages said flaring mouth.

At the outer end of the barrel 35 are the flat-springs 38, which are connected at their outer ends to the studs 39 projecting slightly into the bore 34 so as to engage the nuts and prevent, to a certain extent, their forward movement so as to prevent the nuts from being ejected by the action of the pusher, but said studs will yield readily to allow the nuts to be advanced.

In practical operation, the barrel 35 has its bore filled with nuts, and the bolt to be operated upon is fitted into the seat in the bolt-holder 16. The operator then moves the lever 14 into the position shown in full lines in Fig. 2, whereby the threading-dies or thread chasers 11 are closed and the bolt advanced in position for entering said dies all in the ordinary manner of the use of the said Landis rotary die-head. At the same time, through movement of the rod 21, the pusher 28 is withdrawn to the position indicated in full lines, Fig. 2. The operator then throws the clutch 6 into engagement with the sleeve 8 and rotary movement is imparted to the spindle 5 and to the barrel 35 contained therein. At the same time, rotary movement is also imparted to the rotary die-head 10 carrying the thread chasers 11. The thread chasers form the thread on the bolt, and the bolt is moved through said chasers and engages the first nut in the outer end of the barrel 35, the rotary movement of the barrel with the nut contained therein, threading the nut onto the bolt as the thread is formed by the chasers. The resistance offered by the line of nuts in the barrel is sufficient to insure the nut being threaded on the bolt, and if for any reason the nut should be defective and fail to travel onto the bolt, the inward feed of the bolt will simply push the nuts back in the bore of the barrel and no damage will be done to the machine.

When the bolt has been threaded and the nut engaged therewith, the threading die opens automatically, and when the bolt has been released from the grip of the die chasers, the spring 25 which has been compressed by the forward movement of the rod 21, acts to move the slide-block 12 back to the position indicated in Fig. 4. Movement of the rod to move the slide back also advances the arm 22 and the pusher 28 whereby another nut from the chute 37 is advanced into the bore 34 to take the place of the nut which has just been threaded on the bolt. Another bolt is then brought into position for threading, and the operation just described is repeated.

It is apparent that bolts that have already been threaded may be operated upon in the same manner as above, but in this case, the threading-dies 11 would be omitted and the bolts advanced to engage the nuts in the barrel directly.

By my invention, I provide a very simple form of apparatus by means of which the nuts are fed in succession to the bolts and rapidly threaded thereon, either during the formation of the threads on the bolt, or where the bolts have been previously threaded, thereby doing away with the tedious and slow method heretofore employed where the nuts were screwed onto the bolts by hand.

What I claim is:

1. A machine for applying nuts to bolts, the combination of a hollow rotary spindle for containing a plurality of nuts, means for holding the nuts therein against rotation, a support for the bolt, and means for moving said support to bring said bolt into engagement with the nuts.

2. In a machine for applying nuts to bolts, the combination of a hollow rotary spindle, means for holding the nuts therein against rotation, means for feeding the nuts to said hollow spindle at the rear end thereof, a support for the bolt at the front end of said spindle, and means for advancing and withdrawing said bolt-support to and from said spindle.

3. In a machine for applying nuts to bolts, the combination of a hollow rotary spindle, means for holding the nuts therein against rotation, a pusher at the rear end of said spindle to feed the nuts thereto, a support for the bolt at the front end of said spindle, and means for simultaneously advancing said pusher and withdrawing said support.

4. A machine for applying nuts to bolts, the combination of a hollow rotary spindle, means for holding the nuts therein against rotation, a pusher at the rear end of said spindle to feed the nuts thereto, a support for the bolt at the front end of said spindle, a lever for advancing and withdrawing said bolt holder, and connections between said lever and said pusher, whereby said pusher is advanced when said bolt support is withdrawn.

5. In a machine for applying nuts to bolts, the combination of a hollow rotary spindle, means for holding the nuts therein against rotation, a spring-actuated rod, a pusher at the rear end of said spindle, connections between said pusher and said rod, a movable bolt-support at the front end of said spindle, a lever connected to said support, and means operated by the movement of said bolt-support to move said rod.

6. In a machine for applying nuts to bolts, the combination of a hollow rotary spindle, means for holding nuts therein against rotation, rotary threading dies, means for rotating said spindle, and said threading die simultaneously, said threading dies being arranged at the outer end of said spindle, whereby as the bolt is threaded the bolt engages one of the nuts in said spindle.

In testimony whereof, I the said HENRY OLIVER, have hereunto set my hand.

HENRY OLIVER.

Witnesses:
ROBT. D. TOTTEN,
JOHN F. WILL.